Oct. 4, 1932.　　　H. J. MacCAMY　　　1,881,412
ORE SEPARATOR
Filed Nov. 4, 1929　　　3 Sheets-Sheet 2
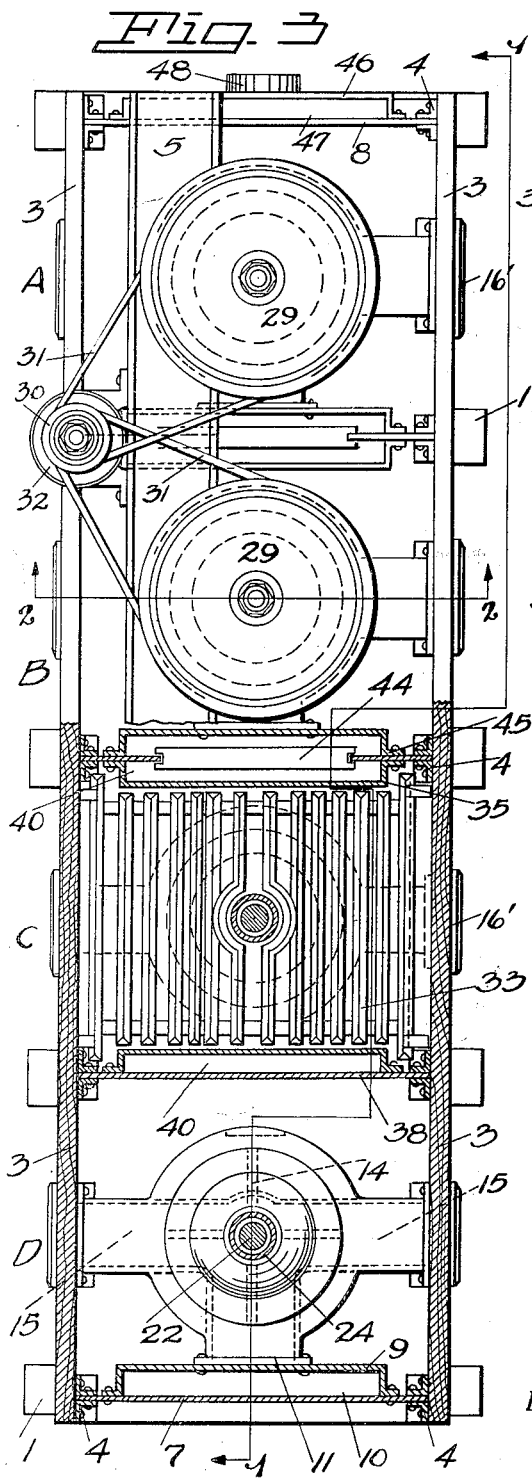
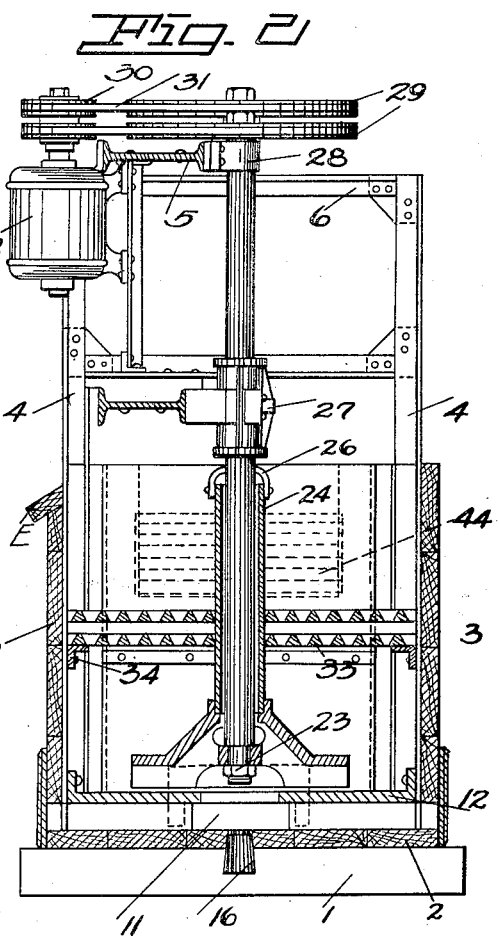
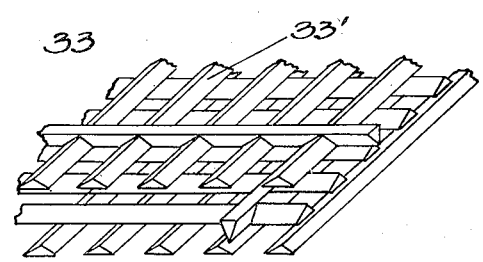
HARRY J. MacCAMY
Inventor
By Herbert E. Smith
Attorney Oct. 4, 1932.    H. J. MacCAMY    1,881,412

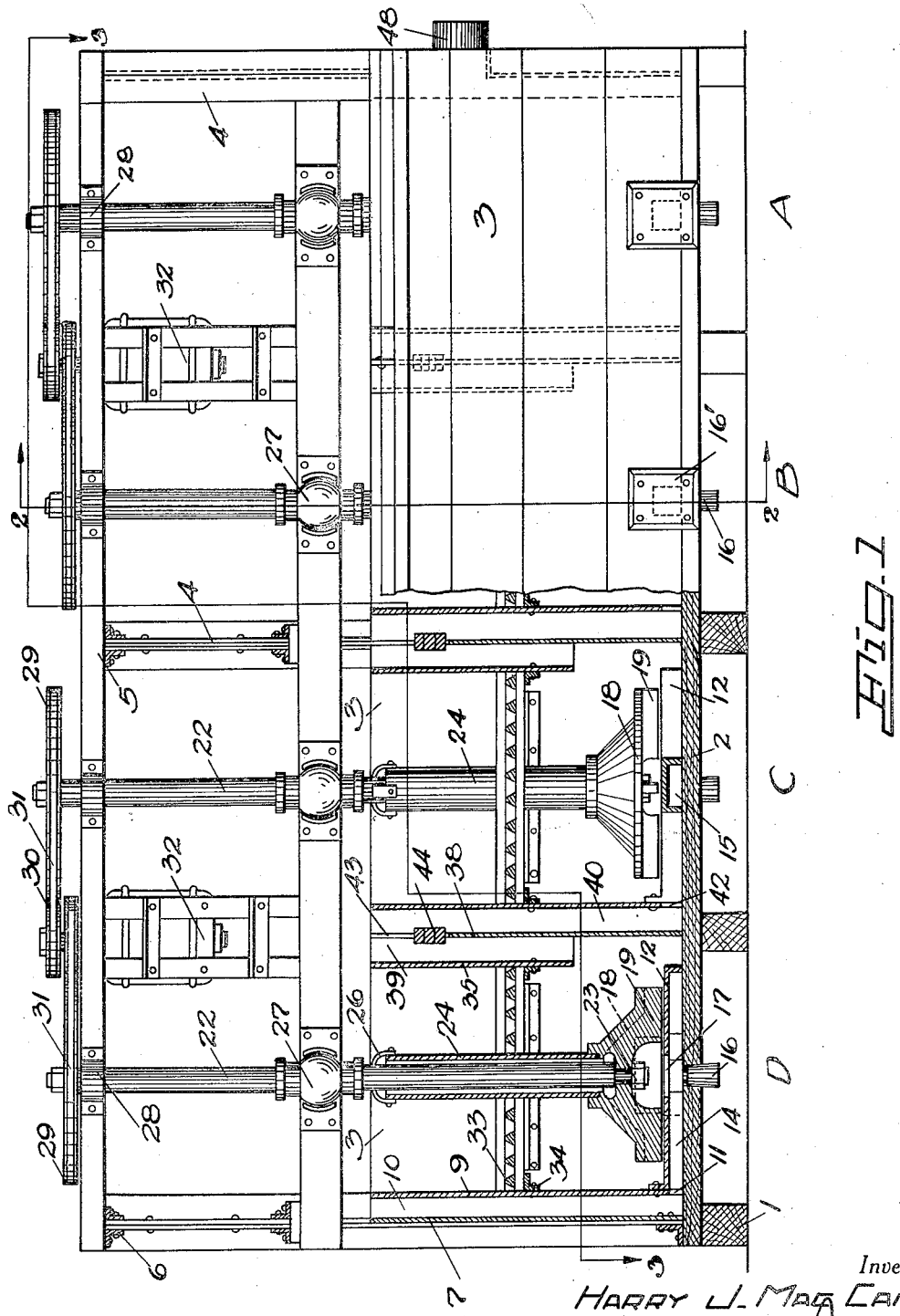

ORE SEPARATOR

Filed Nov. 4, 1929    3 Sheets-Sheet 3

HARRY J. MacCAMY
Inventor

By Herbert E. Smith
Attorney

Patented Oct. 4, 1932

1,881,412

UNITED STATES PATENT OFFICE

HARRY J. MacCAMY, OF SPOKANE, WASHINGTON, ASSIGNOR TO UNION IRON WORKS, OF SPOKANE, WASHINGTON

ORE SEPARATOR

Application filed November 4, 1929. Serial No. 404,578.

My present invention relates to improvements in ore separators of the flotation process type employed in the extraction and recovery of various minerals and metals from their ores. In carrying out my invention I utilize a tank having a series of communicating compartments or units in which the ore pulp is successively treated to insure the extraction and recovery of a minimum quantity of the values, and similar operating parts and structures are employed in the series of compartments or battery of units for this purpose.

The ore is first thoroughly comminuted and then mixed with the necessary amount of water to form a pulp, and the latter is then fed usually to the first compartment or unit for treatment and passes successively through the remaining units. In the illustrated form of my invention four of the compartments or units are employed, but it will be understood that this number may be varied as desired to meet the needs of the operation.

Rotary means are utilized for agitating and aerating the conditioned ore pulp in the compartments, to effect froth formation and recovery of the value in the froth. The separated values are collected as they rise to the surface of the water, and the ore pulp, after its successive treatment is disposed of in usual manner.

Means are also employed to prevent surging of the pulp in the separating compartments, in order that the froth formation may not be unduly disturbed.

The invention consists in certain novel combinations and arrangements of parts in the construction and operation of the apparatus whereby a comparatively inexpensive separator is provided which is simple in construction and operation and highly efficient in the recovery of values contained in the ore. In the accompanying drawings I have illustrated one complete example of the physical embodiment of my invention wherein the parts are combined and arranged according to one mode I have thus far designed for the practical application of the principles of my invention, but it will be understood that various changes and alterations are contemplated and may be made within the scope of my claims without departing from the principles of my invention.

Figure 1 is a view partly in longitudinal section, as at line 1—1 of Figure 3, and partly in elevation, showing a battery of the units in a tank constructed and operating according to my invention.

Figure 2 is a transverse vertical sectional view at line 2—2 of Figure 1.

Figure 3 is a plan view of the apparatus, partly in section, as at line 3—3 of Figure 1.

Figure 4 is a perspective view of part of the perforated partition or grid for suppressing or arresting the gangue in the compartments.

Figure 5:
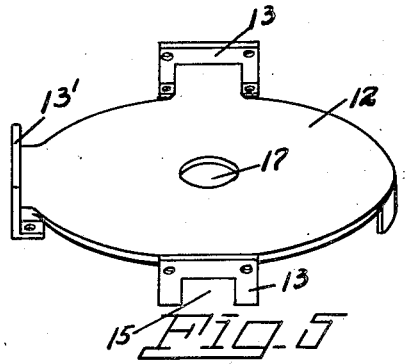
Figure 5 is a top view in perspective of the fixed, elevated base plate with which the rotary agitator cooperates.
Figure 6:
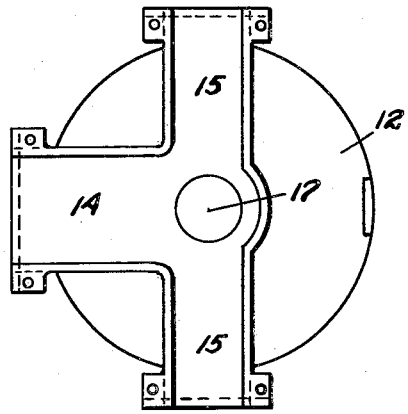
Figure 6 is a bottom plan view of the plate showing the inlet passage and port for the gangue, and the clean-out troughs.
Figure 7:
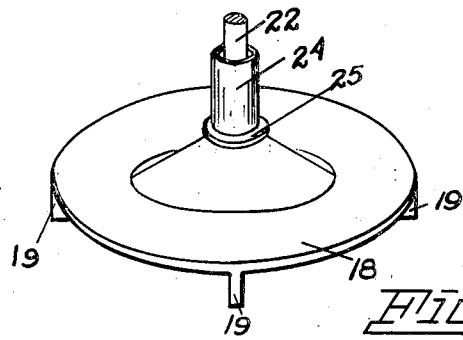
Figure 7 is a top plan view in perspective of the head of a rotary agitator.
Figure 8:
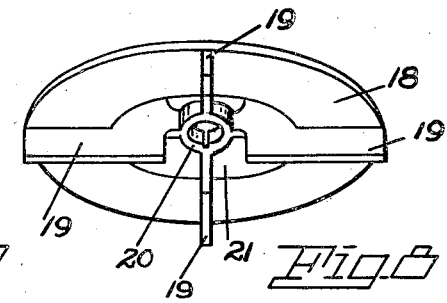
Figure 8 is a bottom plan view of the head in perspective.

In the illustrated form of my invention I have shown four units or compartments A, B, C, and D, and in Figure 2 the discharge ledge E for the froth concentrate is shown for the collection of the concentrates that are separated or extracted from the ore and floated to the level of the discharge ledge.

The tank structure is erected upon sills as 1 and provided with a floor 2 and side walls 3, 3, of wood that may be lined with metal, and metal upright posts 4 are employed at suitable intervals and at the corners of the tank for the support of the overhead structure including longitudinal beams 5 and cross braces 6. The front end wall of the structure is indicated as 7 and the rear end wall as 8, and these walls of course extend from the floor to a suitable height for my purpose.

At the inner side of the front end wall is arranged a partition 9 which forms between it and the wall an inlet or feed flume 10 into which the ore pulp is introduced. The pulp, of course, falls by gravity down the flume and passes out therefrom through an intake port 11 at the floor line of the tank and under an elevated, preferably circular and horizontal base plate 12.

At its edges the base plate is provided with attaching flange 13, 13′ that are bolted respectively to the partition 9 and the side walls of the tank and the plate is elevated above the floor by the use of bottom flanges that form a primary feed channel 14 and secondary feed channels 15, 15. A clean out plug 16 is inserted in an opening in the floor beneath the center inlet port 17 of the plate and access to the channels may be had through the walls of the tank when cover plates 16′ are removed. The cover plates are fixed over openings at the ends of the secondary feed channels, and when these plates are removed tools may be introduced through the troughs for raking out the débris when required, or connecting the secondary or return passages from the overflow ledge to permit of retreatment of the pulp when desired.

The feed channel 14 affords communication between the intake port 11 and the inlet port 17 and the weight of the column of pulp in the feed flume forces it to rise through the inlet port 17 to the upper surface of the base plate, from where the pulp is distributed by the rotary agitator.

The rotary agitator includes a hollow, circular, tapering head 18 suspended just above the base plate, and at its underside, the hollow head is fashioned with a plurality of radial blades 19 disposed in vertical planes. These blades which are integral with the hollow head form a central spider that merges with a bushing 20 within the hollow head, and the blades are cut away as at 21, directly over the port 17 to permit freedom of movement of the pulp through the port 17 to the upper surface of the plate. The head is suspended over the plate at the lower end of a rotary shaft 22, and of course the radial blades, as they rotate over the plate, pass the pulp out from under the head, separating and distributing the material uniformly throughout the bottom portion of the compartment.

The tapered hollow head is secured at the lower end of the shaft by means of a nut 23, or other suitable means, and the shaft, above the head is provided with a tubular housing 24 which fits into a collar 25 at the top of the tapered head. The bore of the housing is sufficiently greater in diameter than the shaft to provide an annular space around the shaft for a column of air to pass down from the upper end of the housing to its lower end, and the agitating or stirring of the pulp permits introduction of air to the pulp within the hollow tapered head for the required aeration of the pulp. The upper end of the housing projects above the water line of the compartment, and spacing lugs or fingers 26 on the housing hold the latter in its spaced relation to the shaft.

The shaft is journaled in the overhead structure in bearings 27 and 28 that are supported by brackets from the structure, and each shaft has a driven pulley as 29. The shafts are preferably driven in pairs from a double or duplex drive pulley 30 through the drive belts 31 passing around the complementary pulleys, and these drive pulleys are operated by means of electric motors 32 supported on the overhead structure of the tank, or in other suitable manner. The hollow head forms a central mixing chamber or space, above the port 17, which space is unobstructed to receive the pulp through the port and to receive the aerating column of air through casing 24. The air and pulp are thoroughly mixed in intimate relation in this central space, and this intimate relation of the two elements insures that the air will adhere to the pulp during both the mixing operation in the hollow head and the distribution of the aerated pulp from the head. In this condition the aerated pulp is distributed in the tank and ascends to the upper part of the tank.

To suppress or destroy surging of the pulp, I utilize one or more grids 33, supported on brackets 34 of the tank walls. These grids which cover the transverse areas of the compartments, are preferably fashioned of spaced slats 33′ arranged at right angles, in spaced series, and the interstices or spaces in the partition are of proper size to permit free circulation of the pulp in the cells. The extracted values in the froth flow over the spillway E, in Figure 2, and are laundered or otherwise disposed of in the usual manner. The froth may be returned to any one of the compartments by way of the concentrate return intake, for further cleaning treatment.

Figure 9:
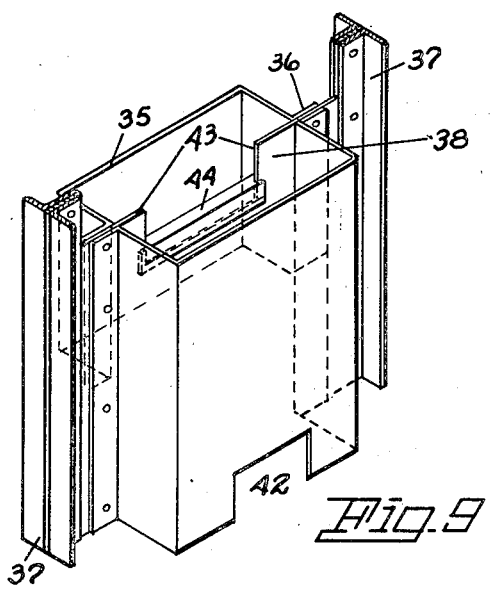
Figure 9 is a perspective view of the flume structure arranged at intervals transversely of the tank to form the separating compartments.
Figure 10:
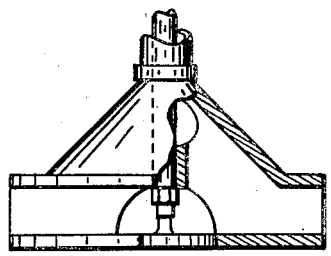
Figure 10 is a modified form of the rotary agitator shown in Figures 7 and 8.

Between the end walls of the tank are spaced at regular intervals, intermediate flume structures 35, that separate the tank into the several extracting or separating compartments, in which are located the separating appliances. As best seen in Figure 9, the flume structure is fashioned of sheet steel or other suitable material, rectangular in horizontal section, with flanged partitions 36 and attaching flanges 37, the latter being bolted or riveted to the opposite sides of the tank, and of course within the tank.

The entire flume structure thus forms a dividing wall between adjoining compartments, but is fashioned to afford means for conveying the pulp from one compartment or cell to a successive one. Thus the flume structure is provided with a central vertical partition 38 that forms at one of its sides an up-channel 39 and at the other end of its sides a down-channel 40. The central partition and the backwall of the flume structure extend to the bottom of the tank, but the front wall of the structure terminates at 41 to provide an elevated inlet at the bottom of the up-channel for the pulp. The back wall of the flume structure, at the floor is cut out to form an outlet from the flume and an inlet port 42 to the complementary channel 14 of a base plate.

The central partition of the flume structure is cut out at 43, 43 to form a weir at its upper edge for regulating and controlling the flow of the pulp from the up-channel to the down-channel as the pulp passes from one compartment to another. The height of the weir or dam and therefore the level of the pulp in the cell may be varied by the use of one or more slats or removable gates 44 that are notched at their ends, 45, to fit over the edges of the opposed vertical walls of the cut-out partition. These slats may be fitted to the notched or cut-out partition, or removed therefrom, with facility, and they afford a simple but effective medium for regulating the flow of the pulp through the tank.

In the last or rear compartment, the end wall 8 is provided with an end plate 46 that provides outlet channel 47 leading to a discharge trough 48 through which the residue of the pulp passes from the last unit.

Having thus fully described my invention, what I claim as new and desire to secure by Letters Patent is:—

1. In an ore separator the combination with a ported base plate having bottom flanges forming an inlet channel, of a rotary shaft, a hollow agitator-head forming a space above the ported base plate and having a spider frame and bushing for the shaft, radial blades on the head projecting from said space and having their free lower edges above the base plate, a tubular housing for the shaft and means for securing the housing to the head, and spacing lugs for holding the housing at its upper end.

2. In an ore separator, the combination with an elevated base plate having an inlet channel and port for pulp, of a rotary hollow agitator head forming an unobstructed mixing space above the port, a rotary shaft for the head, means rotating with the shaft for introducing an aerating column to said mixing space, whereby pulp and air are introduced to and mixed in said space, and means on the head for distributing aerated pulp from said space.

3. In an ore separator, the combination with a ported base plate having a bottom inlet channel for pulp, of a rotary shaft, a hollow tapered agitator head fixed on the shaft and forming a central unobstructed mixing space above the ported plate, impeller blades on the underside of the head radiating from said space and having their lower free edges above the plate, and a tubular housing surrounding and rotatable with the shaft and forming an aerating space communicating with the mixing space, whereby pulp is aerated in said mixing space.

In testimony whereof I affix my signature.

HARRY J. MacCAMY.